(12) United States Patent
Benvenuti

(10) Patent No.: US 10,261,395 B2
(45) Date of Patent: Apr. 16, 2019

(54) UNDERWATER CASE FOR DIGITAL CAMERAS AND VIDEO CAMERAS

(71) Applicant: Easydive Di Benvenuti Fabio, Montaletto di Cervia (IT)

(72) Inventor: Fabio Benvenuti, Montaletto di Cervia (IT)

(73) Assignee: EASYDIVE DI BENVENUTI FABIO, Montaletto di Cervia (RA) (IT)

( * ) Notice: Subject to any disclaimer, the term of this patent is extended or adjusted under 35 U.S.C. 154(b) by 0 days.

(21) Appl. No.: 15/548,411

(22) PCT Filed: Mar. 2, 2016

(86) PCT No.: PCT/IT2016/000051
§ 371 (c)(1),
(2) Date: Aug. 2, 2017

(87) PCT Pub. No.: WO2016/139691
PCT Pub. Date: Sep. 9, 2016

(65) Prior Publication Data
US 2018/0017848 A1 Jan. 18, 2018

(30) Foreign Application Priority Data
Mar. 2, 2015 (IT) .................. 102015000007320

(51) Int. Cl.
*G03B 17/08* (2006.01)
*H04N 5/232* (2006.01)

(52) U.S. Cl.
CPC ......... *G03B 17/08* (2013.01); *H04N 5/23203* (2013.01)

(58) Field of Classification Search
CPC ............................. H04N 5/23203; G03B 17/08

USPC .................................................. 396/27, 427
See application file for complete search history.

(56) References Cited

U.S. PATENT DOCUMENTS

| 5,305,030 | A | 4/1994 | Yokoyama | |
|---|---|---|---|---|
| 8,535,102 | B1* | 9/2013 | Colahan | H01R 31/06 439/5 |
| 8,787,745 | B2* | 7/2014 | Lai | G03B 17/08 396/27 |
| 8,922,985 | B2* | 12/2014 | Richardson | G06F 1/1626 361/679.3 |

(Continued)

FOREIGN PATENT DOCUMENTS

JP 2008 164837 A 7/2008

OTHER PUBLICATIONS

International Search Report and the Written Opinion of PCT/IT2016/000051 dated Jun. 22, 2016.

(Continued)

*Primary Examiner* — Clayton E. LaBalle
*Assistant Examiner* — Linda B Smith
(74) *Attorney, Agent, or Firm* — Hershkovitz & Associates, PLLC; Abe Hershkovitz

(57) ABSTRACT

An underwater case for containing a device, such as a camera, a tv camera and the like comprised also in mobile telephones, smartphones, tablets and the like, comprising control means, arranged on a portion of the underwater case, for activating the device when it is positioned internally of the underwater case, comprising an integrated connection module in wireless mode for activating the device by the control means.

17 Claims, 4 Drawing Sheets

(56) References Cited

U.S. PATENT DOCUMENTS

| | | | |
|---|---|---|---|
| D794,697 S * | 8/2017 | Goodwin | D14/434 |
| 9,742,975 B2 * | 8/2017 | O'Donnell | H04N 5/23206 |
| 9,780,417 B2 * | 10/2017 | Mizrahi | H01M 10/488 |
| 2002/0136557 A1 * | 9/2002 | Shimamura | G03B 17/08 396/535 |
| 2006/0008262 A1 * | 1/2006 | Watanabe | G03B 17/08 396/25 |
| 2007/0071423 A1 * | 3/2007 | Fantone | G03B 17/08 396/27 |
| 2009/0017884 A1 * | 1/2009 | Rotschild | H04M 1/18 455/575.8 |
| 2010/0060747 A1 | 3/2010 | Woodman | |
| 2012/0224078 A1 | 9/2012 | Woodman | |
| 2013/0057758 A1 | 3/2013 | Woodman | |
| 2014/0104447 A1 * | 4/2014 | Woodman | G03B 17/02 348/211.2 |
| 2015/0153289 A1 | 6/2015 | Kim | |
| 2017/0010607 A1 * | 1/2017 | Barlas | A63H 33/005 |
| 2017/0060184 A1 * | 3/2017 | Ranetkins | G03B 17/08 |

OTHER PUBLICATIONS

Search Report and the Written Opinion of Oct. 21, 2015 issued by the Italian Patent Office in the related Italian Application No. 102015000007320.

* cited by examiner

UNDERWATER CASE FOR DIGITAL CAMERAS AND VIDEO CAMERAS

The present invention relates to an underwater case for digital cameras and television cameras.

In greater detail, the invention relates to an underwater case of the above-mentioned type, researched and realised to as to be compatible with all the various models of digital cameras and tv cameras including those installed in mobile telephones, smartphones and tablets, equipped with last-generation connection modules, which are used by users, in particular underwater swimmers, for photographing or filming during dives, but which can also be used for any activity for which protection from the water is necessary.

In the following description reference will be made to an underwater case used by underwater swimmers during underwater dives, but it is very clear that the invention must not be considered to be limited to this specific use.

Underwater cases are well known that are dedicated for each single model of digital camera and tv camera, which exhibit mechanical commands that are specific for activating the tv camera or camera present internally of the underwater case itself.

Further, it is well known that underwater cases at present available mainly have physical communication interfaces such as for example serial ports or Universal Serial Bus (USB).

There also exist cases usable with a plurality of camera or tv camera models, but these have commands that use the infrared or LANC protocol.

Cases are also known which are provided with wireless or wi-fi remote controls but the control is achieved by means of an external tele-command which does not function beyond a 50 meter depth, or is unstable beyond short distances.

It is clear how these prior art cases are limited to the specific model of digital camera or tv camera used by the user, with the consequence of having to replace the case used each time a digital camera or tv camera is used having a different model or connectivity.

Further, should cases with tele-commanded wi-fi connectivity be used, a user cannot use them beyond a depth of 50 meters, which is a very limiting depth for an underwater diver.

In the light of the above, it is therefore an aim of the present invention to realise a universal underwater case which is compatible with all digital camera and tv camera models, even installed in mobile telephones, smartphones and tablets, and in particular equipped with last-general connection modules, such as wireless or wi-fi protocols.

Therefore a specific objective of the present invention relates to an underwater case for containing a device, such as a tv camera and the like, comprising control means, arranged on a portion of said underwater case, for activating said device when it is positioned internally of said underwater case, comprising a connection module in wireless mode for activating said device by said control means.

Further according to the invention, the case comprises an adaptation base internally of said underwater case, comprising a first bracket and a second bracket, said second bracket being slidably coupled with said first bracket, in which said first bracket comprises said connection module in a wireless mode and said second bracket comprises coupling means with said device; and said control means comprise at least a keypad comprising a plurality of magnetic keys.

According to the invention, said first bracket preferably comprises a control logic unit, storage means connected to said logic control unit, power supply means for operating said underwater case, at least a serial port of a USB type and/or at least an infrared module for the data exchange between said underwater case and said device.

Again according to the invention, the underwater case comprises a hatch door for closing said underwater case, provided with a transparent screen, made of a plastic material, preferably polycarbonate, for viewing said device inside said underwater case.

Further according to the invention, the perimeter edge of said hatch door is covered with a seal gasket having a double O-ring to ensure sealing of said underwater case when said hatch door is closed.

According to the invention, said control means preferably comprise a further keypad provided on said underwater case.

Again according to the invention, said underwater case includes following operating steps:

(A) initialization of the electronic components;

(B) checking for presence of said device such as a camera, a tv camera and the like, internally of said underwater case, checking the type of connection module with which said device is provided and enabling said connection module to be used in said data exchange between said underwater case and said device contained therein; and (C) activating control of said device by said control means.

The present invention will now be described by way of non-limiting illustration of the preferred embodiments thereof, with particular reference to the figures of the appended drawings, in which.

In the various figures the parts which are alike are denoted using the same reference numerals.

Figure 1:
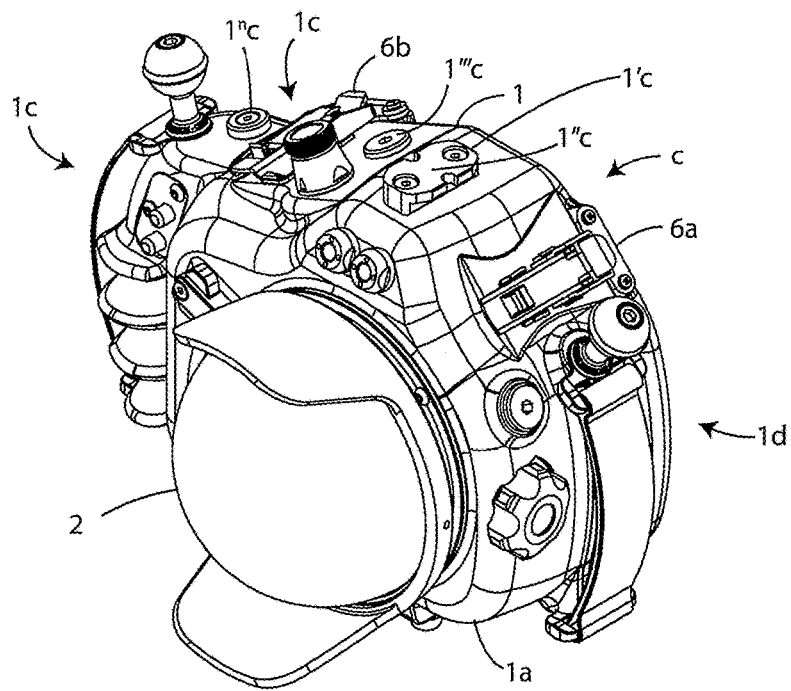
FIG. 1 illustrates a perspective view of the underwater case for digital cameras and television cameras of the invention.
Figure 2:
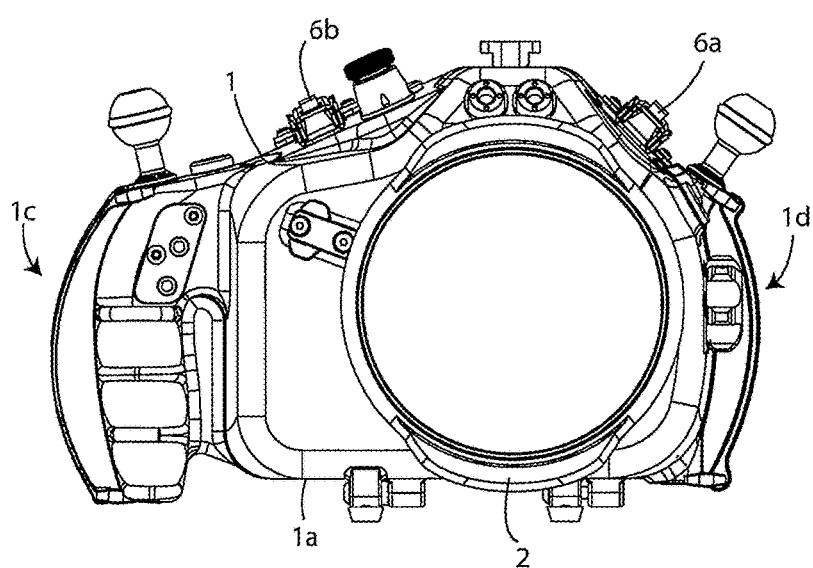
FIG. 2 is a frontal view of the underwater case of FIG. 1.
Figure 3:
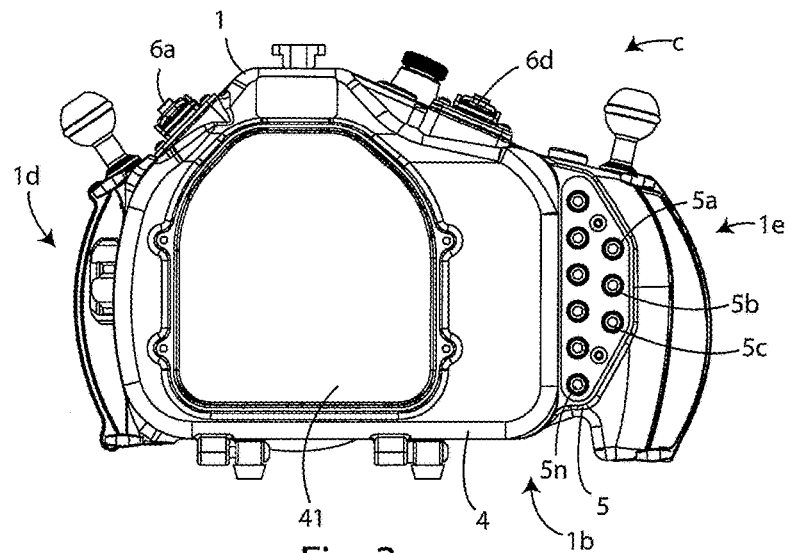
FIG. 3 is a rear view of the underwater case of FIG. 1.

With reference to figures from 1 to 5, the case C comprises a hollow containing structure 1, appropriately profiled for housing digital cameras or tv cameras, including those installed in mobile telephones, smartphones and tablets.

The hollow containing structure 1 is provided with a front face 1*a*, in which a hole is made in which a porthole 2 is inserted, a rear face 1*b* in which an opening 3 for inserting digital cameras or tv cameras or mobile telephones, smartphones and tablets equipped with cameras or tv cameras internally of the case C.

The opening 3 is closed by a hatch door 4.

The hatch door 4 comprises a transparent screen 41, made of a plastic material, preferably polycarbonate, which enables seeing the display of the camera or tv camera housed internally of said case C.

The perimeter edge of said hatch door 4 is covered with a seal gasket 42 having a double O-ring for ensuring coupling with said opening 3.

At least a first keypad 5 is housed in a portion of said rear face 1*b*, hermetically welded on the rear face 1*b* so as to avoid infiltration of water, comprising a plurality of magnetic keys 5*a*, 5*b*, 5*c*, . . . 5*n*, which enable control of the camera or tv camera housed internally of the case C.

Figure 5:
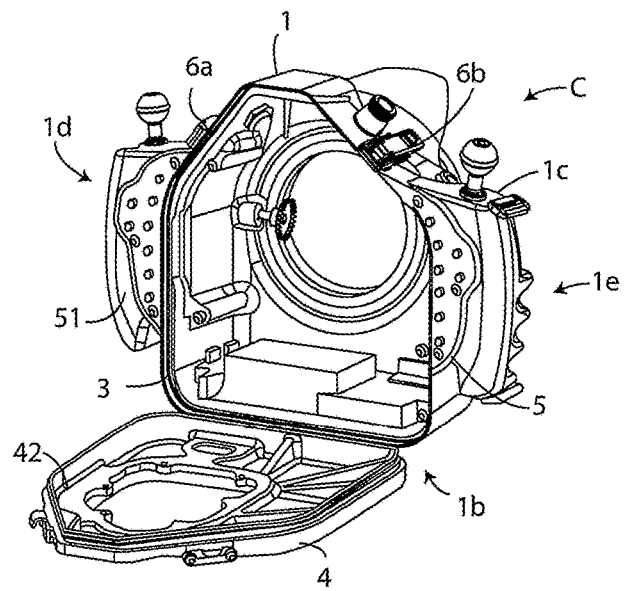
FIG. 5 is a view of the inside of the underwater case of FIG. 1.
Figure 6:
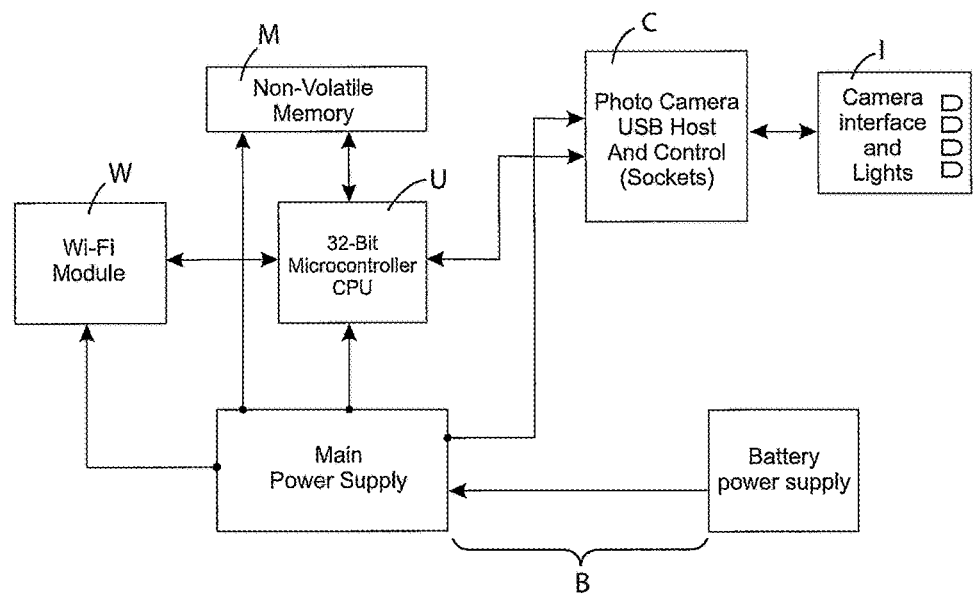
FIG. 6 is a block diagram of the electronic control unit comprised in the underwater case of the invention.
Figure 7:
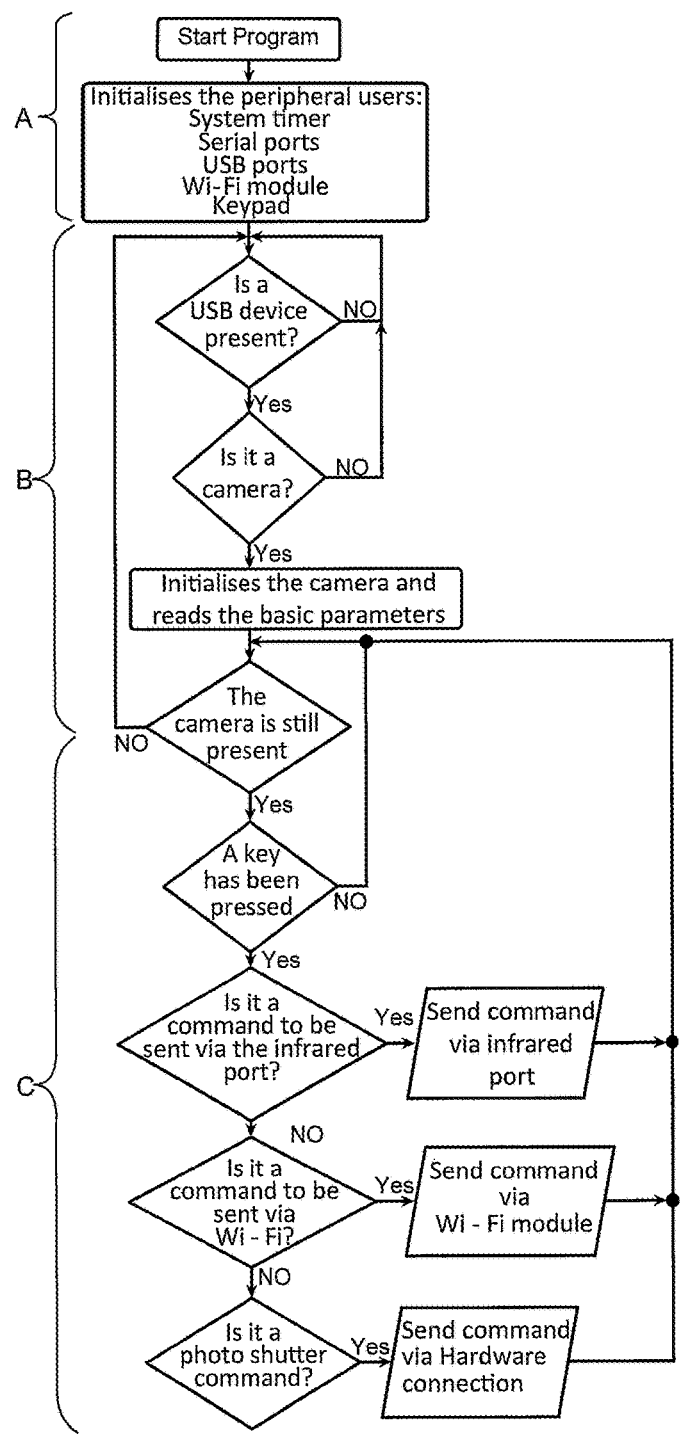
FIG. 7 is a flow chart of the operating of the underwater case of the invention.

As illustrated in FIG. 5, a second keypad 51 can be housed in an opposite portion on said rear face 1b with respect to the portion in which said first keypad 5 is housed, which second keypad 51 has the same structure and function as said first keypad 5.

Said hollow containing structure 1 is provided with an upper surface 1c on which at least a first hinge 6a and a second hinge 6b are fixed, which hook said hatch door 4 in order to guarantee a hermetic closure of said case C.

Said upper surface 1c has a plurality of threaded holes $1_c^1$, $1_c^{11}$, ..., $1_c^n$ for connecting with support elements for lights or flash devices.

Said hollow containing structure 1 is provided with a first lateral surface 1d and a second lateral surface 1 opposite said first lateral surface 1d.

A grip is fashioned on said lateral surface 1d which grip is profiled for enabling a grip by a user.

With reference to FIG. 5, a profiled grip can also be fashioned on said second lateral surface 1e.

Figure 4:
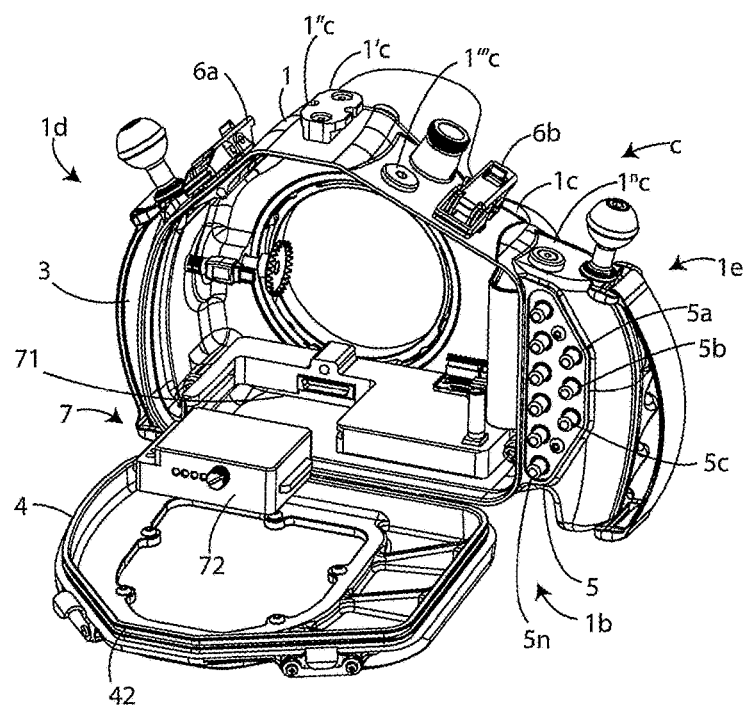
FIG. 4 is an exploded view of the inside of the underwater case of FIG. 1.

With reference to FIG. 4, an adaptation base 7 is present internally of said hollow containing structure 1.

Said adaptation base 7 comprises a first bracket 71 and a second bracket 72.

Said first bracket 71 is fixed internally of said hollow containing structure 1 and comprises the electronic components for the operating of said case C and the coupling means with said second bracket 72.

Said second bracket 72 is the interface between the digital camera and tv camera to be inserted in said case C and said case C itself.

Said second bracket 72 is slidably coupled with said first bracket 71 and enables centring the camera or tv camera internally of said case C, for aligning the lens of the digital devices with the porthole 2 of said case C, and for electronic connection with said first bracket 71.

Said electronic components contained in said first bracket 71 are a logic control unit U, a power supply B, a memory M, a plurality of connection modules such as a USB type port, an infrared port, or with other radio frequencies for supporting the Bluetooth standard, I, and a module W for a wireless or wi-fi connection.

The second bracket 72 varies in relation to the specific camera or tv camera to be inserted in the case C; further, the user is also provided with a remote electronic device, such as a USB type pen drive (not shown), containing the updated versions of the operating program of case C relating to the specific model of camera or tv camera to be inserted in the case C.

The operation of the underwater case C described in the foregoing is done in the following way.

When a user wishes to insert a camera or a tv camera in said case C, he or she opens said hatch door 4 by acting on said first hinge 6a and second hinge 6b, inserts said second bracket 72 in said first bracket 71, fixes the digital camera or tv camera, also installed in mobile telephones, smartphones and tablets on said second bracket 72 and recloses the hatch door 4.

Thereafter the user switches on the "on button of said case C so as to start up the control program.

In a first step A all the electronic peripheral users are initialised, such as the internal clock or "timer" of the case C, said USB and wireless or wi-fi connection modules and said keypad 5.

In a second step B a check is made for presence of a device such as a camera, a tv camera internally of said underwater case C, another check on the type of connection module with which said device is provided and the connection module to be used in said data exchange between said underwater case C and said device contained therein is enabled.

In particular, if internally of the case C there is a mobile telephone, a smartphone or a tablet, the Bluetooth standard is enabled.

In a third step C the control of said device occurs by means of said plurality of magnetic keys 5a, 5b, 5c, ... 5n of said keypad 5, during normal use of said case C by a user.

When a user needs to insert different models of cameras or tv cameras in said case C, it is sufficient to replace said second bracket 72 and update the operating program using a portable electronic device, typically a USB device, which is connected to said first bracket 71 for updating.

As is clear from the foregoing description, said universal underwater case C enables using different models of last-generation cameras or tv cameras in particular having wireless or wi-fi connectivity which is integrated in the case and therefore also functions at depths of 150 meters.

The present invention has been described by way of non-limiting illustrated according to the preferred embodiments, but it is understood that variations and/or modifications might be made thereto by experts in the sector without forsaking the scope of protection thereof, as defined in the appended claims.

The invention claimed is:

1. An underwater case for containing a device, the device comprising at least one of, a camera, a tv camera, mobile telephones, smartphones, and tablets, the underwater case comprising a controller arranged on a portion of said underwater case for activating said device when the device is positioned internally of said underwater case, the underwater case comprising an integrated connection module in wireless mode for activating said device by said controller, the underwater case further comprising an adaptation base internal of said underwater case, the adaptation base comprising a first bracket and a second bracket, said second bracket being slidably coupled with said first bracket, wherein said first bracket comprises said connection module in wireless mode and said second bracket comprises a coupler for coupling with said device; and wherein said controller includes at least a keypad comprising a plurality of magnetic keys.

2. The underwater case according to claim 1, wherein said first bracket comprises a logic control unit, a storage unit connected to said logic control unit, a power supply for operating said underwater case, and at least one of, a serial port of a USB type and an infrared module for data exchange between said underwater case and said device.

3. The underwater case according to claim 1, comprising a hatch door for closing said underwater case, provided with a transparent screen, made of a plastic material, for viewing said device inside said underwater case.

4. The underwater case according to claim 1, wherein said controller comprises a further keypad provided on said underwater case.

5. The underwater case according to claim 1, wherein said underwater case further includes a radio frequency module for supporting a Bluetooth standard, and wherein data exchange between said underwater case and said device takes place using the Bluetooth standard.

6. The underwater case according to claim 2, wherein said logic control unit of said underwater case is configured to:
   (a) initialize the electronic components;
   (b) check for presence of said device;
   (c) check the type of connection module with which said device is provided;

(d) enable said connection module to be used in said data exchange between said underwater case and said device contained therein; and
(e) activate control of said device by said controller.

7. The underwater case according to claim 2, wherein said controller comprises a further keypad provided on said underwater case.

8. The underwater case according to claim 2, comprising a hatch door for closing said underwater case, provided with a transparent screen, made of a plastic material, for viewing said device inside said underwater case.

9. The underwater case according to claim 2, wherein said underwater case further includes a radio frequency module for supporting a Bluetooth standard, and wherein data exchange between said underwater case and said device takes place using the Bluetooth standard.

10. The underwater case according to claim 3, wherein a perimeter edge of said door is covered with a double O-ring seal gasket for ensuring sealing of said underwater case when said hatch door is closed.

11. The underwater case according to claim 3, further comprising a logic control unit configured to:
    (a) initialize the electronic components;
    (b) check for presence of said device;
    (c) check the type of connection module with which said device is provided;
    (d) enable said connection module to be used in said data exchange between said underwater case and said device contained therein; and
    (e) activate control of said device by said controller.

12. The underwater case according to claim 3, wherein said controller comprises a further keypad provided on said underwater case.

13. The underwater case according to claim 3, wherein said underwater case further includes a radio frequency module for supporting a Bluetooth standard, and wherein data exchange between said underwater case and said device takes place using the Bluetooth standard.

14. The underwater case according to claim 3, wherein the plastic material comprises polycarbonate.

15. The underwater case according to claim 10, further comprising a logic control unit configured to:
    (a) initialize the electronic components;
    (b) check for presence of said device;
    (c) check the type of connection module with which said device is provided;
    (d) enable said connection module to be used in said data exchange between said underwater case and said device contained therein; and
    (e) activate control of said device by said controller.

16. An underwater case for containing a device, the device comprising at least one of, a camera, a tv camera, mobile telephones, smartphones, and tablets, the underwater case comprising a controller arranged on a portion of said underwater case for activating said device when the device is positioned internally of said underwater case, the underwater case comprising an integrated connection module in wireless mode for activating said device by said controller;
    an adaptation base internal of said underwater case, the adaptation base comprising a first bracket and a second bracket, said second bracket being slidably coupled with said first bracket, wherein said first bracket comprises said connection module in wireless mode and said second bracket comprises a coupler for coupling with said device; and wherein said controller includes at least a keypad comprising a plurality of magnetic keys;
    wherein said first bracket comprises a logic control unit, a storage unit connected to said logic control unit, a power supply for operating said underwater case, and at least one of, a serial port of a USB type and an infrared module for data exchange between said underwater case and said device;
    a hatch door for closing said underwater case, provided with a transparent screen, made of a plastic material, for viewing said device inside said underwater case;
    wherein said underwater case further includes a radio frequency module for supporting a Bluetooth standard, and wherein data exchange between said underwater case and said device takes place using the Bluetooth standard.

17. A method for containing a device in an underwater case, the device comprising at least one of, a camera, a tv camera, mobile telephones, smartphones, and tablets, the underwater case comprising a controller arranged on a portion of said underwater case for activating said device when the device is positioned internally of said underwater case, the underwater case including an integrated connection module in wireless mode for activating said device by said controller, the underwater case further including an adaptation base internal of said underwater case, the adaptation base comprising a first bracket and a second bracket, said second bracket being slidably coupled with said first bracket, wherein said first bracket comprises said connection module in wireless mode and said second bracket comprises a coupler for coupling with said device, said controller including at least a keypad including a plurality of magnetic keys, said first bracket including a logic control unit, a storage unit connected to said logic control unit, a power supply for operating said underwater case, and at least one of, a serial port of a USB type, an infrared module for data exchange between said underwater case and said device, said method comprising:
    having said logic control unit of said underwater case:
    (a) initialize the electronic components;
    (b) check for presence of said device;
    (c) check the type of connection module with which said device is provided;
    (d) enable said connection module to be used in said data exchange between said underwater case and said device contained therein; and
    (e) activate control of said device by said controller.

* * * * *